United States Patent Office 3,284,543
Patented Nov. 8, 1966

3,284,543
DIPHOSPHINE OXIDES AND DIPHOSPHINE SULFIDES AS FLAME-RETARDANT AGENTS FOR THERMOPLASTIC PRODUCTS
Helen Currier Gillham, Stamford, and Allan Ellis Sherr, Norwalk, Conn., assignors to American Cyanamid Company, Stamford, Conn., a corporation of Maine
No Drawing. Filed Oct. 16, 1963, Ser. No. 316,525
7 Claims. (Cl. 260—887)

This invention relates to flame-retardant compositions. More particularly, this invention relates to flame-retardant compositions comprising thermoplastic polymers containing a flame retarding amount of a diphosphine oxide or sulfide. More particularly, this invention relates to flame-retardant compositions comprising thermoplastic polymers containing a flame retarding amount of a diphosphine oxide or sulfide having the formula

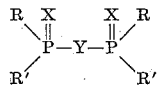

wherein R and R' individually represent hydrogen, an aryl radical ($C_6$–$C_{10}$), an alkyl radical ($C_1$–$C_6$), an aralkyl radical ($C_7$–$C_{11}$), a carbamoylalkyl radical ($C_1$–$C_6$), a cyanoalkyl radical ($C_1$–$C_6$), a carboxylalkyl radical ($C_1$–$C_6$), and halo and polyhalo substituted aralkyl ($C_7$–$C_{11}$) radicals, Y represents an alkylene radical ($C_1$–$C_4$), and X is sulfur or oxygen, no more than one of R and R' being hydrogen.

The use of various materials incorporated into thermoplastic resins in order to improve the flame retardance thereof is known in the prior art. Many compounds are commercially available for such a use, among them being chlorostyrene copolymers, chlorinated paraffin wax with triphenyl stibine, chlorinated paraffins and aliphatic antimonyl compounds, as well as antimony oxide-chlorinated hydrocarbon mixtures. A drawback, however, of these compounds and mixtures of compounds has been the fact that generally a large amount, i.e. upwards of 35%, of the additive must be incorporated into the resin in order to make it sufficiently flame retardant. Also these prior art additives tend to crystallize or oil out of the resin after a relatively short time of incorporation. We have now found a group of compounds which may be added to thermoplastic resins, in relatively small amounts, and still result in the production of satisfactory flame-retardant compositions and do not crystallize or oil out of the resin after incorporation therein.

The production of thermoplastic resin compositions which are flame-retardant, i.e. have high resistance to heat, is of considerable commercial importance. For example, such articles as castings, moldings, foamed or laminated structures and the like are required, or at least desired, to be resistant to fire and flame and to possess the ability to endure heat without deterioration. Typical illustrations of such applications can be found in castings for live electrical contacts which should not be ignited or deteriorated by heat and sparks. Structural members such as pipes, wall coverings, wall paneling, windows etc., and items such as ash trays, waste baskets, fibers and the like are further examples of products wherein flame retardance is desirable.

It is therefore an object of the present invention to provide novel flame retardant thermoplastic resin compositions.

It is a further object of the present invention to provide flame retardant compositions comprising thermoplastic polymers and a flame-retarding amount of a diphosphine oxide or sulfide, such as those represented by Formula I.

These and further objects will become more apparent to those skilled in the art upon reading the more detailed description set forth hereinbelow.

THE THERMOPLASTIC POLYMERS

The thermoplastic polymers into which the flame retardant agents may be incorporated to produce the novel compositions of the present invention, are generally the vinyl type polymers wherein the monomeric material is polymerized, by any known method, via the vinyl unsaturation therein. Examples of the vinyl type polymers which may be used to form our novel compositions are the acrylates and methacrylates, the vinyl halides, the vinylidene halides, the vinyl acetates, polyvinyl butyral, butadiene copolymers, acrylonitrile-butadiene-styrene polymers, the acrylonitriles, etc. Additionally and preferably, one may incorporate the flame retardant agents mentioned above into such polymers as the α-olefin polymers, such as the homopolymers and copolymers etc. containing, as the major constituent, ethylene, propylene, and the like and the acrylates and methacrylate polymers produced from monomers having the formula (II)
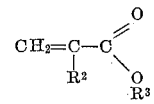

wherein $R^2$ is a hydrogen or methyl radical and $R^3$ is a hydrogen or an alkyl radical having from 1 to 6 carbon atoms, inclusive. Examples of monomers represented by Formula II include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate, and their corresponding alkyl methacrylates.

Additional examples of monomers which may be used to form the thermoplastic vinyl polymers encompassed by the present invention, polymerized either singularly or in combination with each other or with the other compounds set forth hereinafter, are such monomers as the unsaturated alcohol esters, more particularly the allyl, methallyl, vinyl, methvinyl, butenyl, etc., unsaturated esters of aliphatic and aromatic monobasic acids such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methylstyrene, alpha-methyl-para-methylstyrene, etc.; unsaturated ethers, e.g., ethyl vinyl ether, diallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc. and ethylene.

Other examples of monomers that can be used as polymers to form the resin portion of our novel flame-retardant compositions are the vinyl halides, more particularly, vinyl fluoride, vinyl chloride, vinyl bromide and vinyl iodide, and the various vinylidene compounds, including the vinylidene halides, e.g., vinylidene chloride, vinylidene bromde, vinylidene fluoride, and vinylidene iodide, other comonomers being added, if needed, in order to improve the compatibility and copolymerization characteristics of the mixed monomers.

More specific examples of allyl compounds that can be polymerized to useful polymers, useful in the production of our novel flame-retardant compositions, are allyl alcohol, methallyl alcohol, diallyl carbonate, allyl lactate, allyl methacrylate, allyl alpha-hydroxyisobutyrate, allyl trichlorosilane, diallyl phthalate, diallyl methylgluconate, diallyl tartronate, diallyl tartrate, diallyl mesaconate, the diallyl ester of muconic acid, and diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, allyl diglycol carbonate, etc. Other examples of allyl compounds that may be employed are given, for example, in U.S. Patent No. 2,510,503, issued June 6, 1950.

These above mentioned monomers may be polymerized, copolymerized, etc.; in any known manner such as by free-radical generating catalysts, irradiation, anion and cation type catalysts and the like, said method of polymerization forming no part of the present invention.

THE DIPHOSPHINE OXIDES AND SILFIDES

As mentioned above, we have discovered that the addition of diphosphine oxides or sulfides to a thermoplastic resin results in the production of resinous compositions having excellent flame-retardant properties. According to the present invention, diphosphine oxides or sulfides, stable to processing conditions, may be used for this purpose. A preferred group of diphosphine axides and sulfides, however, are those represented by Formula I. A further preferred group of diphosphine oxides and sulfides useful in producing our novel compositions are those wherein R and R' of Formula I are the same. The diphosphine oxides and sulfides may be incorporated into the resins in flame - retarding amounts, i.e. generally amounts ranging from about 10%, by weight, to about 35%, by weight, preferably 15% to 25%, by weight, based on the weight of the polymer have been found sufficient.

These diphosphine oxides and sulfides may be incorporated into the resin by any known method. That is to say, the flame-retardant diphosphine oxide or sulfide additive may be combined with the resin by milling the resin and the sulfide or oxide on, for example, a two-roll mill, in a Banbury mixer etc., or the sulfide or oxide may be added by molding it and resin simultaneously, extruding it and resin or by merely blending the resin in powder form with the oxide or sulfide and thereafter forming the final desired article. Additionally, the diphasphine oxide or sulfide may also be added during the resin manufacture, i.e., during the monomer polymerization procedure, provided the catalyst etc. and other ingredients of the polymerization system are inert thereto.

The diphosphine oxides and sulfides set forth hereinabove may be produced in any known manner without varying from the scope of the present invention. Various methods for the production of diphosphine oxides of this type are disclosed in, for example, U.S. Patent 3,032,-589; and Issleib et al., Berichte, 92, 3175 (1959), and this article and patent are hereby incorporated herein by reference.

For example, one procedure for the production of these diphosphine oxides and sulfides comprises reacting an excess of a compound of the formula

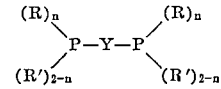

wherein Y, R and R' are as defined above in regard to Formula I, and $n$ is a whole positive integer of from 1–2, inclusive, with $H_2O_2$ or oxygen to form the oxide or with sulfur to form the sulfide. The reaction, in either case, is maintained at reflux by the use of, for example, Dry Ice, and the resultant diphosphine oxide or sulfide may then be isolated by filtration or by solvent evaporation. Yields usually are from 50% to 100% of the theoretical, said procedures, however, forming no part of the present invention.

The diphosphine starting material from which the oxide or sulfide is prepared, may be produced, for example, as described in articles by Chatt et al., J. Chem. Soc., p. 1378, 1960, or Hewertson et al., J. Chem. Soc., p 1490, 1960.

Examples of compounds which are represented by Formula I and are therefore useful in producing the novel compositions of the present invention include:

methylenebis(diphenyl)phosphine oxide and sulfide,
methylenebis(dinaphthyl)phosphine oxide and sulfide,
ethylenebis(dinaphthyl)phosphine oxide and sulfide,
ethylenebis(diphenyl)phosphine oxide and sulfide,
propylenebis(ditolyl)phosphine oxide and sulfide,
propylenebis(dixylyl)phosphine oxide and sulfide,
propylenebis(diphenyl)phosphine oxide and sulfide,
butylenebis(dimethyl)phosphine oxide and sulfide,
methylenebis(diethyl)phosphine oxide and sulfide,
ethylenebis(di-n-propyl)phosphine oxide and sulfide,
butylenebis(diisopropyl)phosphine oxide and sulfide,
methylenebis(di-n-butyl)phosphine oxide and sulfide,
ethylenebis(di-t-butyl)phosphine oxide and sulfide,
propylenebis(diisobutyl)phosphine oxide and sulfide,
butylenebis(dipentyl)phosphine oxide and sulfide,
methylenebis(dihexyl)phosphine oxide and sulfide,
ethylenebis(dibenzyl)phosphine oxide and sulfide,
propylenebis[bis(2-phenethyl)phosphine oxide and sulfide],
butylenebis[(3-phenylpropyl)phosphine oxide and sulfide],
methylenebis[bis(4-phenylbutyl)phosphine oxide and sulfide],
ethylenebis[bis(naphthylmethyl)phosphine oxide and sulfide],
propylenebis[bis(carbamoylmethyl)phosphine oxide and sulfide],
butylenebis[bis(2-carbamoylethyl)phosphine oxide and sulfide],
methylenebis[bis(2-carbamoyl-n-propyl)phosphine oxide and sulfide],
ethylenebis[bis(4-carbamoyl-n-butyl)phosphine oxide and sulfide],
propylenebis[bis(2-carbamoyl-n-butyl)-phosphine oxide and sulfide],
butylenebis[bis(5-carbamoylpentyl)phosphine oxide and sulfide],
methylenebis[bis(6-carbamoylhexyl)phosphine oxide and sulfide], ethylenebis[bis(cyanomethyl)phosphine oxide and sulfide],
propylenebis[bis(2-cyanoethyl)phosphine oxide and sulfide],
butylenebis[bis(1-cyanoethyl)phosphine oxide and sulfide],
methylenebis[bis(3-cyanopropyl)phosphine oxide and sulfide],
ethylenebis[bis(3-cyanobutyl)phosphine oxide and sulfide],
propylenebis[bis(1-cyanopentyl)phosphine oxide and sulfide],
butylenebis[bis(3-cyanohexyl)phosphine oxide and sulfide],
methylenebis[bis(carboxymethyl)phosphine oxide and sulfide],
ethylenebis[bis(2-carboxyethyl)phosphine oxide and sulfide],
propylenebis[bis(3-carboxypropyl)phosphine oxide and sulfide],
butylenebis[bis(1-carboxypropyl)phosphine oxide and sulfide],
methylenebis[bis(3-carboxybutyl)phosphine oxide and sulfide],
ethylenebis[bis(2-carboxypentyl)phosphine oxide and sulfide],
propylenebis[bis(6-carboxyhexyl)phosphine oxide and sulfide],
butylenebis[bis(4-chlorobenzyl)phosphine oxide and sulfide],
methylenebis[bis(2-bromobenzyl)phosphine oxide and sulfide],
ethylenebis[bis(3-iodobenzyl)phosphine oxide and sulfide],
propylenebis[bis(2,4-difluorobenzyl)phosphine oxide and sulfide],
butylenebis[bis(3,4-dichlorobenzyl)phosphine oxide and sulfide],
methylenebis[bis(p-bromophenethyl)phosphine oxide and sulfide],
ethylenebis[bis[3-(p-iodophenyl)propyl]phosphine oxide and sulfide],
propylenebis[bis[2-(o-fluorophenyl)butyl]phosphine oxide and sulfide],
butylenebis[bis[3-(o,m,p-trichlorophenyl)butyl]phosphine oxide and sulfide],
methylenebis[bis[(2-bromonaphthyl)methyl]-phosphine oxide and sulfide],
ethylenebis[bis[(2,4-difluoronaphthyl)methyl]phosphine oxide and sulfide],
methylenebis(tolylphenyl)phosphine oxide and sulfide,
ethylenebis(ethylpropyl)phosphine oxide and sulfide,
propylenebis(methyl-n-hexyl)phosphine oxide and sulfide,
propylenebis[2-phenethyl)(1-cyanopentyl)]phosphine oxide and sulfide,
butylenebis[(naphthylmethyl)(2-carbamoyl-n-butyl)]phosphine oxide and sulfide,
methylenebis[(3,4-dichlorobenzyl)(3-carboxyethyl)]phosphine oxide and sulfide,
ethylenebis[(p-bromophenethyl)naphthyl]phosphine oxide and sulfide,
propylenebis[3-(o-fluorophenyl)](3-iodobenzyl)]phosphine oxide and sulfide,
butylenebis(phenyl)phosphine oxide and sulfide,
methylenebis(methyl)phosphine oxide and sulfide,
ethylenebis(hexyl)phosphine oxide and sulfide,
propylenebis(2-phenethyl)phosphine oxide and sulfide,
butylenebis(5-carbomoylpentyl)phosphine oxide and sulfide,
butylenebis(naphthylmethyl)phosphine oxide and sulfide,
methylenebis(2-cyanoethyl)phosphine oxide and sulfide,
ethylenebis(2-cyanobutyl)phosphine oxide and sulfide,
propylenebis(3-carboxypropyl)phosphine oxide and sulfide,
butylenebis(3,4-difluorobenzyl)phosphine oxide and sulfide,
ethylenebis(p-bromophenethyl)phosphine oxide and sulfide,
ethylenebis[3-(p-iodophenyl)propyl]phosphine oxide and sulfide,
propylenebis[(2-bromonaphthyl)methyl]phosphine oxide and sulfide,
butylenebis(benzyl)phosphine oxide and sulfide,
ethylenebis(carbamoylmethyl)phosphine oxide and sulfide,
ethylenebis(3-cyanopropyl)phosphine oxide and sulfide,
butylenebis(4-chlorobenzyl)phosphine oxide and sulfide,
ethylenebis(2,4-diiodobenzyl)phosphine oxide and sulfide,
methylenebis[3-(o,m,p-trifluorophenyl)butyl]phosphine oxide and sulfide,
propylenebis(3-carboxypentyl)phosphine oxide and sulfide,
butylenebis(4-carbamoyl-n-butyl)phosphine oxide and sulfide and the like.

It is within the scope of the present invention to incorporate such ingredients as plasticizers, dyes, pigments, fillers, stabilizers, antioxidants, antistatic agents and the like to our novel compositions without detracting from the advantageous properties thereof.

The following examples are set forth for purposes of illustration only and are not to be construed as limitations on the present invention except as set forth in the appended claims. All parts and percentages are by weight unless otherwise specified.

Any appropriate flame retardance test may be used to determine the flame retardance properties of any specific compound. One test which is reasonably efficient is that designated as a modified version of ASTM test D–635–56T. The specifications for this test are: a specimen, 5" in length, 0.5" in width and 0.045" in thickness, is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If after the two burnings, the strip is not burned to the 4" mark, the specimen is designated as "self-extinguishing" or "flame-retardant."

*Example 1*

Seventy-five parts of polyethylene and 25 parts of ethylenebis(diphenyl)phosphine oxide are milled together on a two roll mill at about 170° C. The resulting milled composition is molded into strips 5" in length, 0.5" in width and 0.45" in thickness and said strips are then subjected to an art recognized flame-retardance test. The strips pass the test and are therefore designated as flame-retardant.

Following the procedure of Example 1, the following examples were carried out utilizing different flame retardant agents and various thermoplastic resin polymers. The results of these examples are set forth in Table I below. In each instance the resultant plastic-diphosphonium halide mixture passed the flame-retardance test and was designated as flame and fire retardant. In the table, PE=polyethylene; PP=polypropylene;

PMMA=poly(methyl methacrylate)

PA=poly(acrylic acid); AN=acrylonitrile; ST=styrene and BD=butadiene.

TABLE I

| Ex. | Polymer | Flame Retardant | | | | Percent |
|---|---|---|---|---|---|---|
| | | R | R' | Y | X | |
| 2 | PMMA | C₆H₅– | C₆H₅– | CH₂CH₂ | S | 20 |
| 3 | PE | C₆H₅– | C₆H₅– | (CH₂)₄ | O | 25 |
| 4 | PE | naphthyl | naphthyl | CH₂ | O | 25 |
| 5 | PE | CH₃ | CH₃ | CH₂CH₂CH₂ | O | 25 |
| 6 | PP | CH₃CH₂CH₂CH₂ | CH₃CH₂CH₂CH₂ | CH₂CH₂CH₂ | S | 30 |
| 7 | PE | CH₃(CH₂)₅ | CH₃(CH₂)₅ | CH₂CH₂CH₂CH₂ | O | 25 |
| 8 | PP | C₆H₅–CH₂ | C₆H₅–CH₂ | CH₂ | O | 25 |
| 9 | PE | C₆H₅–(CH₂)₄ | C₆H₅–(CH₂)₄ | CH₂CH₂ | S | 20 |
| 10 | PMMA | naphthyl–CH₂ | naphthyl–CH₂ | (CH₂)₃ | O | 20 |
| 11 | PE | H₂N–C(O)–CH₂ | H₂N–C(O)–CH₂ | (CH₂)₂ | O | |
| 12 | PE | H₂N–C(O)–(CH₂)₆ | H₂N–C(O)–(CH₂)₆ | CH₂CH₂ | S | 20 |
| 13 | PP | NCCH₂ | NCCH₂ | CH₂CH₂ | S | 20 |
| 14 | PE | NCCH₂CH₂ | NCCH₂CH₂ | (CH₂₃) | O | 20 |
| 15 | PE | NC(CH₂)₆ | NC(CH₂)₆ | (CH₂)₃ | O | 30 |
| 16 | PE | HO–C(O)–CH₂ | HO–C(O)–CH₂ | (CH₂)₃ | S | 15 |
| 17 | PE | NC(CH₂)₃ | NC(CH₂)₃ | CH₂ | O | 20 |
| 18 | PP | HO–C(O)–C(CH₃)₂H | HO–C(O)–C(CH₃)₂H | CH₂CH₂ | O | 25 |
| 19 | MMA/ST/AN 71/19/10 | HO–C(O)–(CH₂)₆ | HO–C(O)–(CH₂)₆ | (CH₂)₄ | S | 30 |
| 20 | PE | 3,4-F₂-C₆H₃–CH₂ | 3,4-F₂-C₆H₃–CH₂ | (CH₂)₃ | O | 20 |
| 21 | PE | Cl–C₆H₄–CH₂ | Cl–C₆H₄–CH₂ | CH₂ | O | 20 |
| 22 | PMMA | Br–C₆H₄–CH₂ | Br–C₆H₄–CH₂ | CH₂ | O | 25 |
| 23 | PE | I–C₆H₄–CH₂ | I–C₆H₄–CH₂ | (CH₂)₂ | O | 20 |
| 24 | PP | I₂–C₆H₃–(CH₂)₄ | I₂–C₆H₃–(CH₂)₄ | (CH₂)₂ | S | 30 |
| 25 | PE | F-naphthyl–CH₂ | F-naphthyl–CH₂ | CH₂ | O | 20 |

TABLE I—Continued

| Ex. | Polymer | Flame Retardant | | | | Percent |
|---|---|---|---|---|---|---|
| | | R | R' | Y | X | |
| 26 | Mixture of BD-AN (10-75%) and AN-ST (25-90%).[1] | phenyl | CH₃ | (CH₂)₂ | O | 25 |
| 27 | PMMA | naphthyl | CH₃(CH₂)₅ | (CH₂)₂ | O | 30 |
| 28 | PA | (CH₃)₂CH—CH₂ | —C₆H₄—CH₃ | (CH₂)₄ | S | 20 |
| 29 | PE | NCCH₂ | NC(CH₂)₃ | CH₂ | O | 25 |
| 30 | PP | H | H₂N—C(O)—(CH₂)₃ | CH₂ | O | 25 |
| 31 | PE | naphthyl-CH₂ | H | CH₂ | O | 20 |
| 32 | PE | HO—C(O)(CH₂)₂ | CH₃(CH₂)₅ | (CH₂)₂ | S | 20 |
| 33 | PMMA | F—C₆H₃(F)—CH₂ | CH₃—C₆H₄—CH₂ | CH₂ | O | 25 |
| 34 | PE | phenyl | H | (CH₂)₂ | O | 20 |
| 35 | PE | Cl—C₆H₃(Cl)—(CH₂)₄ | HO—C(O)—CH₂ | (CH₂)₄ | S | 30 |
| 36 | PP | NC(CH₂)₃ | CH₃—C₆H₃—CH₃ | CH₂ | O | 20 |
| 37 | PMMA | CH₃ | CH₃CH₂ | CH₂ | O | 20 |
| 38 | Mixture of BD-AN (10-75%) and AN-ST (25-90%).[1] | H₂N—C(O)—CH(CH₃)CH₂ | CH₃—CH(CH₃)—CH₂ | (CH₂)₂ | S | 25 |
| 39 | PA | C₆H₅—CH₂ | cyclopentyl | (CH₂)₃ | O | 20 |
| 40 | MMA/ST/AN 71/19/10 | CH₃CH₂ | NCCH₂CH₂ | CH₂ | O | 20 |
| 41 | PE | H | CH₃(CH₂)₄ | CH₂ | S | 25 |
| 42 | PMMA | CH₃—C₆H₃—CH₃ | H | (CH₂)₂ | S | 20 |
| 43 | PP | CH₃ | phenyl | (CH₂)₄ | S | 20 |

[1] U.S. Patent No. 2,439,202.

We claim:
1. A flame-retardant composition comprising a thermoplastic polymer produced from at least one ethylenically unsaturated monomer and a flame-retarding amount of a compound having the formula

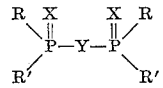

wherein R and R' are individually selected from the group consisting of hydrogen, an aryl radical having from 6 to 10 carbon atoms, inclusive, an alkyl radical having from 1 to 6 carbon atoms, inclusive, an aralkyl radical having from 7–11 carbon atoms, inclusive, a carbamoylalkyl radical having from 1 to 6 carbon atoms, inclusive, in the alkyl group, a cyanoalkyl radical having from 1 to 6 carbon atoms, inclusive, in the alkyl group, a carboxyalkyl radical having from 1–6 carbon atoms, inclusive, in the alkyl group, a halo substituted aralkyl radical having from 7 to 11 carbon atoms, inclusive, and a polyhalo substituted aralkyl radical having 7 to 11 carbon atoms, inclusive, Y represents an alkylene radical having from 1 to 4 carbon atoms, inclusive, and X is selected from the group consisting of oxygen and sulfur, no more than one of R and R' being hydrogen.

2. A flame retardant composition according to claim 1 wherein the thermoplastic polymer is a polymer of an α-olefin.

3. A flame retardant composition comprising polyethylene and a flame retarding amount of ethylenebis(diphenyl)phosphine oxide.

4. A flame retardant composition according to claim 1 wherein the thermoplastic polymer is a polymer of a compound having the formula

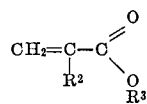

wherein $R^2$ is selected from the group consisting of hydrogen and a methyl radical and $R^3$ is selected from the group consisting of hydrogen and an alkyl radical having from 1 to 6 carbon atoms, inclusive.

5. A flame retardant composition according to claim 1 wherein the thermoplastic polymer is poly(methyl methacrylate).

6. A flame retardant composition comprising poly(methyl methacrylate) and a flame retarding amount of ethylenebis(diphenyl)phosphine oxide.

7. A flame retardant composition according to claim 1 wherein the thermoplastic polymer is a mixture of (A) a butadiene-acrylonitrile copolymer and (B) an acrylonitrile-styrene copolymer, the amount of A and B ranging from about 10–75% to 90–25%, respectively.

References Cited by the Examiner
UNITED STATES PATENTS 3,076,034 1/1963 Gordon _____ 260—45.7
3,092,606 6/1963 Ruppert et al. _____ 260—45.7

OTHER REFERENCES

Plastics in Engineering, Penton, Cleveland, 1943, page 20.

LEON J. BERCOVITZ, *Primary Examiner.*

M. J. WELSH, *Assistant Examiner.*